(12) United States Patent
Takeda et al.

(10) Patent No.: US 7,458,340 B2
(45) Date of Patent: Dec. 2, 2008

(54) WATER HEATER

(75) Inventors: Nobuhiro Takeda, Hyogo (JP); Hiroshi Asakura, Hyogo (JP); Akira Tsutsumi, Hyogo (JP); Kazuhiro Kimura, Hyogo (JP); Shuji Kameyama, Hyogo (JP); Keiichi Amada, Hyogo (JP); Hironao Matsunaga, Hyogo (JP)

(73) Assignee: Noritz Corporation, Hyogo (JP)

( * ) Notice: Subject to any disclaimer, the term of this patent is extended or adjusted under 35 U.S.C. 154(b) by 75 days.

(21) Appl. No.: 11/661,263

(22) PCT Filed: Dec. 16, 2005

(86) PCT No.: PCT/JP2005/023155

§ 371 (c)(1),
(2), (4) Date: Feb. 27, 2007

(87) PCT Pub. No.: WO2006/068052

PCT Pub. Date: Jun. 29, 2006

(65) Prior Publication Data

US 2008/0006226 A1    Jan. 10, 2008

(30) Foreign Application Priority Data

Dec. 22, 2004  (JP) .............................. 2004-372321

(51) Int. Cl.
*F22B 1/02* (2006.01)

(52) U.S. Cl. .................... 122/31.1; 122/33; 165/157

(58) Field of Classification Search ............... 122/15.1, 122/18.1, 31.1, 33, 235.34, 240.3; 165/157, 165/172, 173, 175, 177, 178, 179
See application file for complete search history.

(56) References Cited

U.S. PATENT DOCUMENTS

| 1,686,970 | A | * | 10/1928 | Hoadley | ..................... 165/175 |
| 1,894,760 | A | * | 1/1933 | Dodd | ......................... 165/110 |
| 3,135,322 | A | * | 6/1964 | Neugebauer | ................ 165/158 |

(Continued)

FOREIGN PATENT DOCUMENTS

JP          59-055271 U       4/1984

(Continued)

OTHER PUBLICATIONS

International Search Report.

*Primary Examiner*—Gregory A Wilson
(74) *Attorney, Agent, or Firm*—Rader, Fishman & Grauer, PLLC

(57) ABSTRACT

A secondary heat exchanger B for recovering latent heat from combustion gas includes water tubes 5 each of which is so inclined that a first end 50a is positioned lower than a second end 50b. Therefore, in draining water from each of the water tubes 5, water can be caused to flow smoothly into a water-inflow and hot-water-outflow header 6A connected to the first ends 50a. The secondary heat exchanger B includes a casing 7 which includes an upper wall 70a and a bottom wall 70b which are so inclined that the inner surfaces thereof extend generally in parallel with the water tubes 5, and the upper and the lower gaps 79a and 79b have constant widths s2 and s3. Therefore, the amount of heat recovery from the combustion gas passing through the gaps 79a and 79b can be increased.

9 Claims, 7 Drawing Sheets

U.S. PATENT DOCUMENTS

| | | | | |
|---|---|---|---|---|
| 4,621,681 | A * | 11/1986 | Grover | 165/47 |
| 6,415,744 | B1 * | 7/2002 | Choi | 122/18.1 |
| 6,427,638 | B1 * | 8/2002 | Kolbusz et al. | 122/15.1 |
| 6,907,846 | B2 * | 6/2005 | Hur et al. | 122/32 |
| 7,258,080 | B2 * | 8/2007 | Missoum et al. | 122/18.1 |

FOREIGN PATENT DOCUMENTS

| | | |
|---|---|---|
| JP | 63-054982 A | 3/1988 |
| JP | 07-167586 A | 7/1995 |
| JP | 07-293802 A | 11/1995 |
| JP | 09-159282 A | 6/1997 |
| JP | 2000-130856 A | 5/2000 |
| JP | 2002-039623 A | 2/2002 |
| JP | 2004-061069 A | 2/2004 |
| JP | 2004-239467 A | 8/2004 |
| JP | 2004-245515 A | 9/2004 |

* cited by examiner

WATER HEATER

TECHNICAL FIELD

The present invention relates to a water heater for producing hot water by generating combustion gas by a burner and recovering heat from the combustion gas by a heat exchanger.

BACKGROUND ART

Some water heaters include a secondary heat exchanger for recovering latent heat in addition to a primary heat exchanger for recovering sensitive heat (See Patent Documents 1-4, for example). With this structure, the heat exchange efficiency can be enhanced as compared with the structure designed to recover only sensitive heat from combustion gas. However, when latent heat is recovered from combustion gas, water vapor contained in the combustion gas condenses to form condensate water. Generally, condensate water having absorbed sulfur oxide, nitrogen oxide and so on contained in the combustion gas has a strong acidity of about pH 3.

In the above-described water heater, the secondary heat exchanger may be made of e.g. acid-resistant stainless steel so as not to be corroded due to the strongly acidic condensate water. On the other hand, the primary heat exchanger is generally made of e.g. copper for reducing the manufacturing cost for the entirety of the heat exchangers. Since such primary heat exchanger is not acid-resistant, the primary heat exchanger needs to be so designed that strongly acidic condensate water is not formed accompanying the heat recovery. On the other hand, the secondary heat exchanger is not subjected to such restriction on the design. Therefore, to enhance the heat exchange efficiency of the water heater, it is desired to increase the amount of heat recovery by the secondary heat exchanger as much as possible. Conventionally, therefore, for the secondary heat exchanger, a water tube whose diameter is smaller than that of the primary heat exchanger is often employed as a means to increase the amount of latent heat recovery.

However, the above-described conventional structure has the following drawbacks.

First, when the driving of the water heater is stopped in winter, it is desired to prevent the interior of the water tube of the heat exchanger from freezing. To prevent the freezing without using an antifreeze heater, it is necessary to drain water from the water tube after the water inflow to the water tube is stopped. Such draining of water may be sometimes necessary also at the time of maintenance of the water heater. Since the water tube of the primary heat exchanger has a relatively large diameter, water in the water tube can be smoothly discharged to the outside. In the secondary heat exchanger, however, the diameter of the water tube is relatively small, as noted above. Therefore, due to the surface tension of water generated in the water tube, the water in the water tube may not be smoothly discharged to the outside. As a result, water remains in the water tube and freezes.

Secondly, when condensate water remains adhering to a wide range of the surface of a water tube of the secondary heat exchanger, the heat exchange between the water tube and the combustion gas is hindered by the condensate water, whereby the heat exchange efficiency is deteriorated. Conversely, when much condensate water drops down from a water tube of the secondary heat exchanger, the primary heat exchanger is contaminated and corroded due to the condensate water dropped from the secondary heat exchanger in the case where the primary heat exchanger is arranged directly under the secondary heat exchanger.

The Patent Document 5 discloses a structure in which the water tube of the secondary heat exchanger is inclined so that condensate water formed at a surface of the water tube flows toward the lower end of the water tube and is also evaporated in flowing. However, since the driving of the water heater is not constant, much condensate water may be formed at a surface of the water tube of the secondary heat exchanger. In such a case, with the structure disclosed in the Patent Document 5, part of the condensate water may directly drop from the water tube to contaminate the region below the water tube. Further, all amounts of the condensate water may not be evaporated before reaching the lower end of the water tube. In such a case, unevaporated condensate water may reach the lower end of the water tube to flow below to contaminate the adjacent portions. Moreover, although the water tube is inclined in the water heater of the Patent Document 5, specific measures are not taken to properly drain water from the water tube. Therefore, the draining of water to prevent freezing, for example, cannot be performed easily and properly. Similarly to the Patent Document 5, the Patent Document 6 also discloses a structure in which a water tube of the heat exchanger is inclined to cause condensate water to flow toward the lower end of the water tube of the heat exchanger. Also in this case, it is difficult to properly solve the above-described problems only by such a structure.

Patent Document 1: JP-A 7-167586
Patent Document 2: JP-A 9-159282
Patent Document 3: JP-A 2004-245515
Patent Document 4: JP-A 2004-61069
Patent Document 5: JP-A 2002-39623
Patent Document 6: JP-U 59-55271

DISCLOSURE OF THE INVENTION

Problems to be Solved by the Invention

An object of the present invention is to provide a water heater which is capable of solving or alleviating the above-described problems.

Means for Solving the Problems

To solve the above-described problems, the present invention takes the following technical measures.

According to the present invention, there is provided a water heater comprising a burner, a primary heat exchanger for recovering sensitive heat from combustion gas generated by the burner, and a secondary heat exchanger for recovering latent heat from the combustion gas. The secondary heat exchanger comprises a plurality of water tubes extending in a predetermined direction and each including a first end and a second end spaced from each other in the predetermined direction, a casing including a plurality of walls surrounding the water tubes, one of the walls being formed with a gas supply port for introducing combustion gas passed through the primary heat exchanger into the secondary heat exchanger whereas another one of the walls being formed with a gas discharge port for discharging the combustion gas to outside, and a header including a water inlet and a hot-water outlet and connected to the respective first ends of the water tubes for performing water inflow to the water tubes and hot-water outflow from the water tubes. The water tubes are so inclined that the first ends are positioned lower than the second ends for causing water to flow into the header when water inflow is stopped to drain water from the water tubes. The plurality of walls of the casing include an upper wall and a bottom wall positioned above and below the water tubes via an upper gap and a lower gap, respectively, and a rear wall and a front wall positioned behind and in front of the water tubes, respectively. The rear wall comprises the wall formed with the gas supply port whereas the front wall comprises the wall formed with the gas discharge port, so that the combustion gas flows through a space between the water tubes and through the upper and the lower gaps generally horizontally and widthwise in a front and rear direction of the casing. The upper wall and the bottom wall are so inclined that inner surfaces thereof extend generally in parallel with the water tubes, and each of the upper and the lower gaps has a width which is generally constant along the predetermined direction.

Preferably, in a front view of the casing, the gas discharge port extends in a direction inclined with respect to the inner surfaces of the upper wall and the bottom wall, and the casing is so oriented that the discharge port extends horizontally.

Preferably, the water tubes are divided into two groups in the front and rear direction of the casing. The header includes a water inflow chamber and a hot-water outflow chamber each of which is connected to the first ends of the water tubes of a respective one of the groups. The water inlet and the hot-water outlet are formed at the water inflow chamber and the hot-water outflow chamber, respectively. The water inflow chamber and the hot-water outflow chamber are arranged side by side in the front and rear direction of the casing. One of the water inlet and the hot-water outlet is provided at a portion which is offset toward an upper end of the corresponding one of the water inflow chamber and the hot-water outflow chamber, whereas the other one of the water inflow chamber and the hot-water outflow chamber is provided at a portion which is offset toward a lower end of the corresponding one of the water inflow chamber and the hot-water outflow chamber. Of the water inflow chamber and the hot-water outflow chamber, the chamber in which the water inlet or the hot-water outlet is provided at a portion offset toward the upper end of the chamber is formed with an auxiliary water discharge port for discharging water from the chamber to outside, and the auxiliary water discharge port is provided at a portion offset toward the lower end of the chamber.

Preferably, the primary heat exchanger is arranged at either one of a position above the casing of the secondary heat exchanger and a position below the casing of the secondary heat exchanger and includes a housing for passing the combustion gas and a water tube at least partially arranged in the housing for performing heat exchange with the combustion gas. The casing and the plurality of water tubes of the secondary heat exchanger have a horizontal dimension which is larger than the width of the housing to protrude toward sides of the housing, and the protruding dimension is larger on the second end side than the first end side.

Preferably, the water heater according to the present invention further comprises a controller for controlling driving of the burner, and a neutralizer for neutralizing condensate water formed accompanying latent heat recovery. The secondary heat exchanger is provided on the housing of the primary heat exchanger so that, on a side of the housing, a space is defined below the protruding portion on the second end side of the secondary heat exchanger. At least one of the controller and the neutralizer is arranged in the space.

Preferably, at least part of the header is positioned within the casing so that dropwise condensation formed on an outer surface of the header drops onto the bottom wall of the casing.

Preferably, the header comprises a water tube mount to which the first end of each of the water tubes is connected, a dimension setting member including an end fixedly connected to the water tube mount, a header cover bonded to the water tube mount with part of which held in contact with another end of the dimension setting member and defining each of the chambers between the header cover and the water tube mount, and a bolt for fixing the header cover to the another end of the dimension setting member. The casing of the secondary heat exchanger includes a side wall laid on an outer surface of the header cover, and the sidewall is connected by the bolt to the dimension setting member together with the header cover.

Preferably, the water heater further comprises a combustion gas flow controlling means provided in the casing for preventing combustion gas passed through the gas supply port from directly flowing toward the bottom wall of the casing.

Preferably, the combustion gas flow controlling means includes a plate-like portion projecting generally horizontally from a lower edge of the gas supply port toward the front wall.

Other features and advantages of the present invention will become more apparent from description of embodiments of the present invention given below with reference to the accompanying drawings.

BEST MODE FOR CARRYING OUT THE INVENTION

Figure 1:
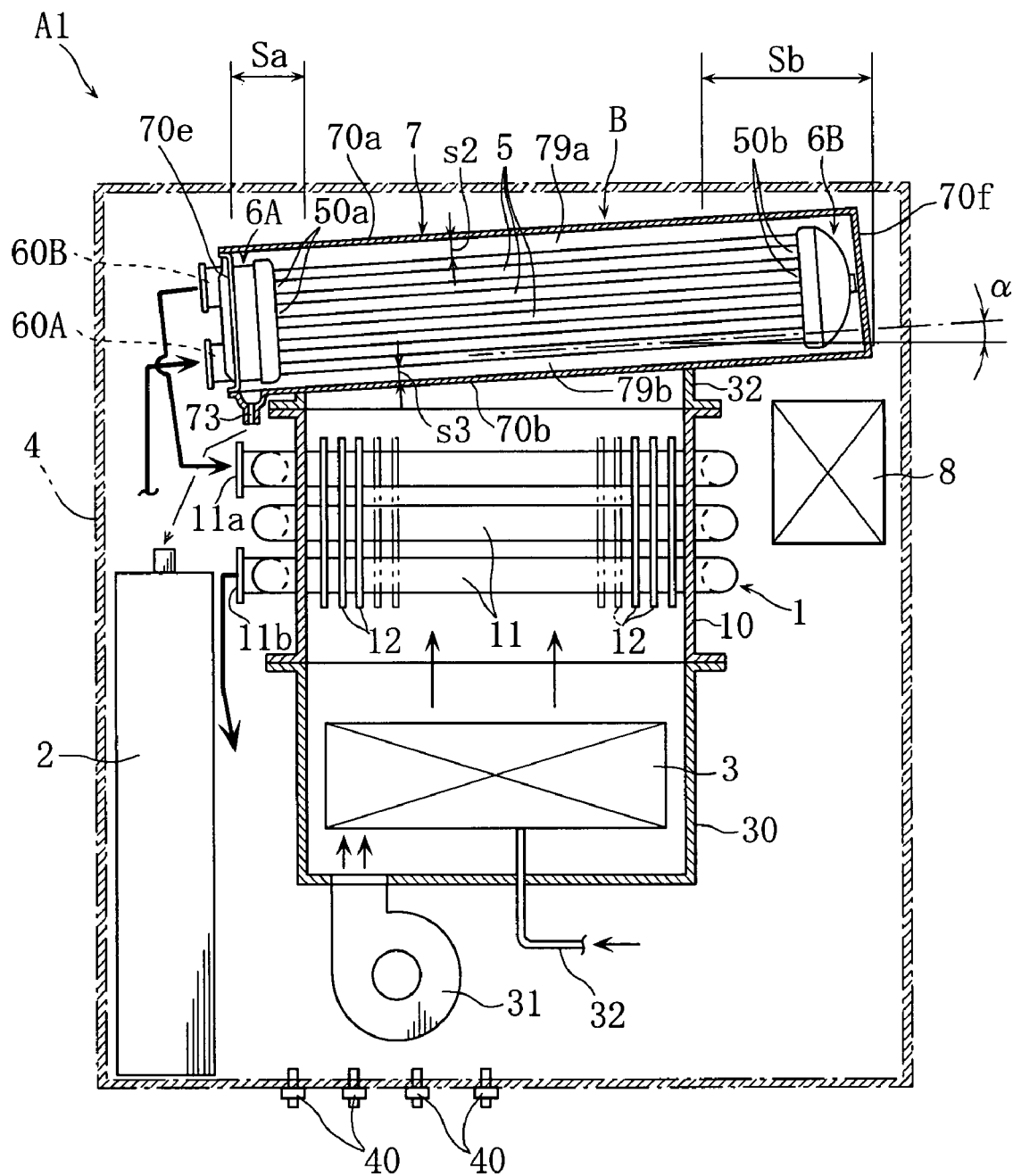
FIG. 1 is a schematic front sectional view showing an example of water heater according to the present invention.

Preferred embodiments of the present invention will be described below with reference to the accompanying drawings.

FIGS. 1-8 show an embodiment of water heater according to the present invention. As better shown in FIG. 1, the water heater A1 of this embodiment includes a burner 3, a primary heat exchanger 1, a secondary heat exchanger B, a neutralizer 2, and an external casing 4 for enclosing these parts.

The burner 3, which is arranged in a housing 30 having an upper open end, is a gas burner for burning fuel gas supplied through a pipe 32. A fan 31 is arranged below the housing so that air for combustion is supplied from the fan upward into the housing 30. The basic structure of the primary heat exchanger 1 is similar to that of conventionally known heat exchangers and includes a water tube 11 provided with a plurality of fins 12 and penetrating through the housing 10 in a generally horizontal direction. On the housing 30 of the burner 3, a housing 10 is mounted. The combustion gas generated by the burner 3 flows upward within the housing 10.

The secondary heat exchanger B is arranged above the primary heat exchanger 1 and connected to the housing 10 via an auxiliary housing 32. The secondary heat exchanger B includes a plurality of water tubes 5, a pair of headers 6A, 6B and a casing 7 enclosing the water tubes 5. Preferably, these structural parts of the secondary heat exchanger B are made of an acid-resistant material such as stainless steel so as not to be easily corroded by acidic condensate water.

Each of the water tubes 5 has a straight linear configuration extending in a predetermined direction. To increase the amount of heat recovery, each of the water tubes 5 comprises a relatively thin tube whose diameter is smaller than that of the water tube 11 of the primary heat exchanger 1. Each of the water tubes 5 includes a first and a second longitudinally opposite ends 50a and 50b connected to the headers 6A and 6B, respectively. The water tube 5 is inclined with respect to the horizontal at an appropriate angle of α (approximately 5 to 20 degrees, for example) so that the height of the first end 50a is lower than that of the second end 50b.

The casing 7 is in the form of a generally rectangular parallelepiped and includes an upper wall 70a, a bottom wall 70b, a front wall 70c, a rear wall 70d and side walls 70e, 70f each of which is in the form of a generally flat plate. The upper wall 70a and the bottom wall 70b are positioned above and below the water tubes 5, respectively, and inclined similarly to the water tubes 5. The inner surfaces of the upper wall 70a and the bottom wall 70b extend generally in parallel with the water tubes 5. Therefore, the width s2 of a gap 79a between the water tubes 5 and the upper wall 70a as well as the width s3 of a gap 79b between the water tubes 5 and the bottom wall 70b are generally constant throughout the length of the water tubes 5. The width s2 and the width s3 may be equal to or different from each other.

The bottom wall 70b of the casing 7 is so arranged as to cover the entire lower region of the water tubes 5 to receive condensate water formed due to latent heat recovery and dropping from each of the water tubes 5. At a lower end of the bottom wall 70b, a discharge port 73 for discharging condensate water to the outside is provided. As indicated by a phantom line in FIG. 1, the condensate water discharged from the discharge port 73 is guided into the neutralizer 2 by using an appropriate pipe. For example, the neutralizer 2 may comprise a container made of resin and a neutralizing agent contained in the container. For example, the neutralizing agent may be calcium carbonate. The condensate water is neutralized by passing through the neutralizer 2 and is then discharged to the outside of the external casing 4.

Figure 2:
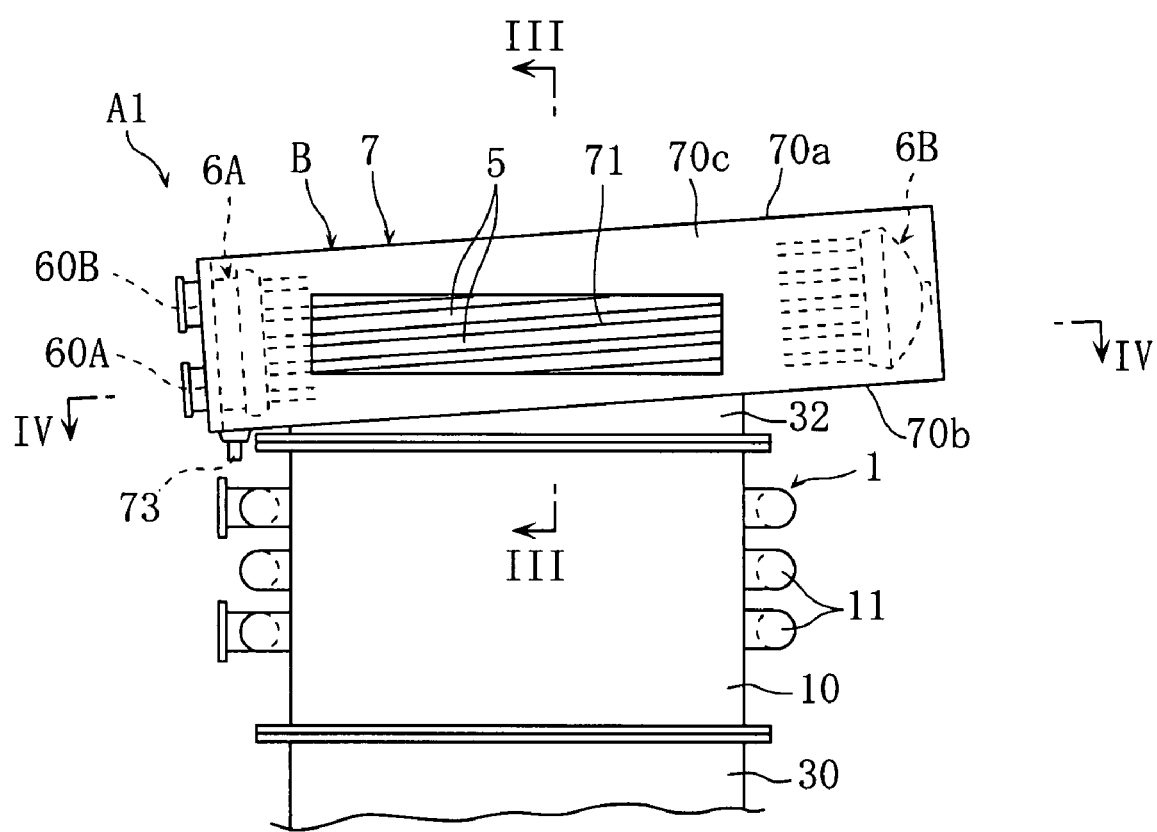
FIG. 2 is a front view of a principal portion of the water heater shown in FIG. 1.
Figure 3:
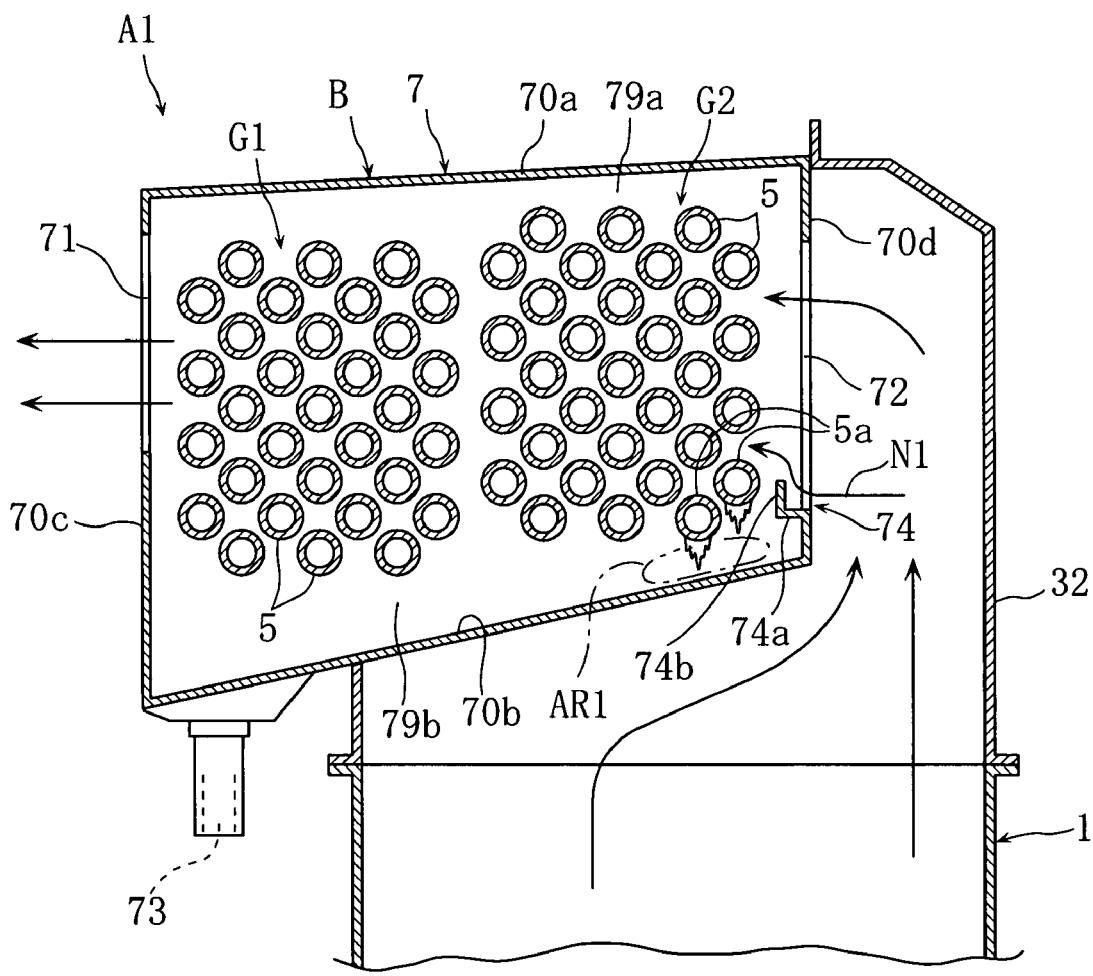
FIG. 3 is a sectional view taken along lines III-III in FIG. 2.

As shown in FIG. 3, the rear wall 70d of the casing 7 is formed with a gas supply port 72 for introducing the combustion gas passed through the primary heat exchanger 1 into the casing 7. The front wall 70c is formed with a gas discharge port 71 for discharging combustion gas to the outside. As shown in FIG. 2, the gas discharge port 71 is in the form of an elongated rectangle inclined relative to the direction in which the upper wall 70a and the bottom wall 70b of the casing 7 and the water tubes 5 extend or has a configuration similar to this. The casing 7 is held in such an inclined posture that the gas discharge port 71 extends horizontally.

Figure 4:
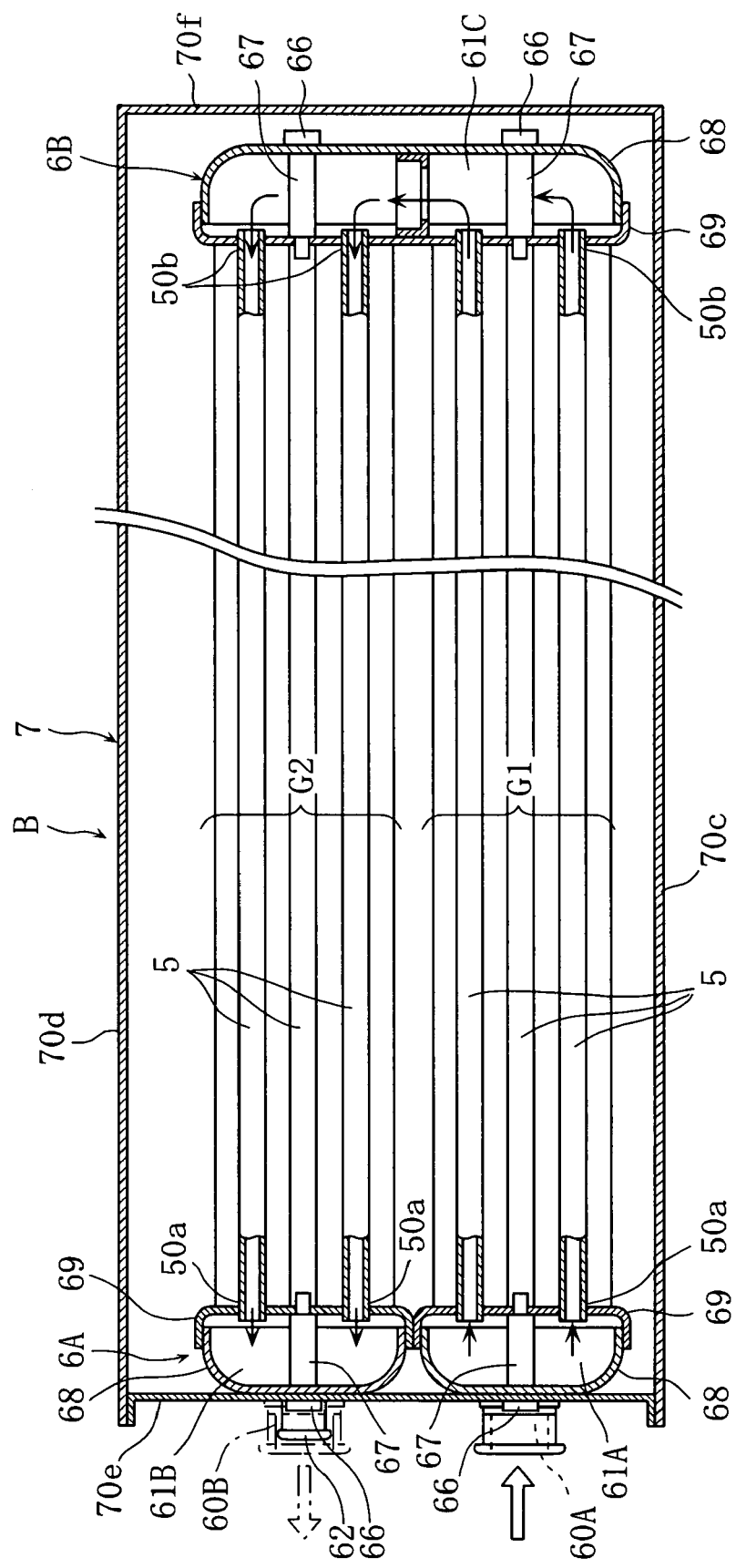
FIG. 4 is a sectional view taken along lines IV-IV in FIG. 2.

As shown in FIG. 4, the header 6A includes a water inflow chamber 61A and a hot-water outflow chamber 61B. The chambers 61A and 61B respectively include a water inlet 60A and a hot-water outlet 60B which are connected to the first ends 50a of the water tubes 5. The water tubes 5 are divided into two groves G1 and G2 connected to the two chambers 61A and 61B, respectively. The header 6B includes a common chamber 61C connected to the second ends 50b of the water tubes 5. In the secondary heat exchanger B, water supplied into the water inflow chamber 61A from the water inlet 60A flows through the water tubes 5 of the group G1 to reach the common chamber 61C. Subsequently, the water flows through the water tubes 5 of the group 2 to flow into the hot-water outflow chamber 61B and is then discharged, through the hot-water outlet 60B. The paired headers 6A and 6B are positioned on the inner side of the side walls 70e and 70f of the casing 7 and accommodated in the casing 7. As will be described later, this structure provides advantages which are particularly effective when dropwise condensation occurs at the outer surfaces of the headers 6A and 6B.

Figure 5:
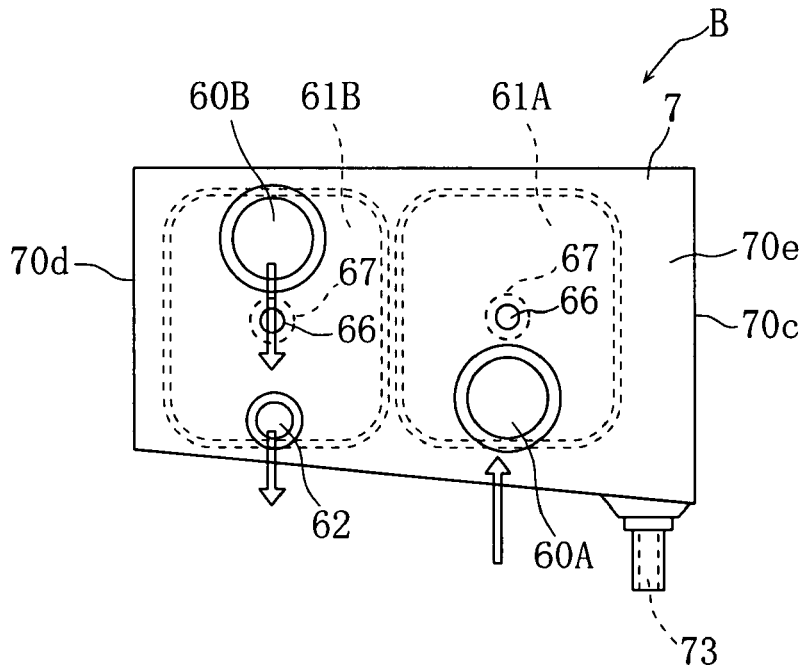
FIG. 5 is a left side view of a secondary heat exchanger of the water heater shown in FIG. 1.

As shown in FIG. 5, the water inlet 60A is provided at a lower portion of the water inlet chamber 61A, whereas the hot-water outlet 60B is provided at an upper portion of the hot-water chamber 61B. An auxiliary water discharge port 62 for draining water is provided in the hot-water chamber 61B at a lower portion below the hot-water outlet 60B. In the case where both of the water inlet 60A and the hot-water outlet 60B are provided at lower portions unlike this embodiment, when water supplied to the water inlet 60A flows through the two groups G1, G2 of water tubes 5, water flows concentratedly through lower regions of the water tubes. In this case, water flow through upper regions is insufficient. In this embodiment, however, such a problem is properly solved due to the height difference between the water inlet 60A and the hot-water outlet 60B. When the hot-water outlet 60B is provided at a higher portion, it is difficult to discharge water from the chamber 61B through the hot-water outlet 60B in draining water from the water tubes 5. In this embodiment, however, water in the chamber 61B can be properly discharged by utilizing the auxiliary water discharge port 62. To the auxiliary water discharge port 62 is connected an end of an appropriate pipe (not shown) provided with a valve. The other end of the pipe is positioned outside the external casing 4. The valve is normally closed, and when the valve is opened, water in the hot-water outflow chamber 61 is discharged from the auxiliary water discharge port 62 to the outside of the external casing 4. Although the water inlet 60A and the hot-water outlet 60B are provided at a lower position and a higher position, respectively, the present invention is not limited thereto. For example, conversely to the above, the water inlet 60A may be provided at a higher position, whereas the hot-water outlet 60B may be provided at a lower position. In this case, the auxiliary water discharge port 62 is provided at a lower portion of the water inflow chamber 61A.

The structure of the header 6A will be described in more detail with reference to FIG. 6. The water inflow chamber 61A of the header 6A comprises a water tube mount 69 to which the first ends 50a of the water tubes 5 are connected, and a header cover 68 attached to the water tube mount. The header cover 68 is bowl-shaped, and the water inlet 60A is formed at the header cover 68. The header cover 68 includes a circumferential edge 68a which is fitted to a standing portion 69a formed along the periphery of the water tube mount 69. The fitted portion is bonded by brazing, for example. In this bonding, a bolt-like dimension setting member 67 is used so that a predetermined distance s1 is defined between the water tube mount 69 and the header cover 68. The dimension setting member 67 is positioned at almost the center of the chamber 61A. The dimension setting member 67 includes an end formed with a stepped portion and a threaded shaft 67a whose diameter is smaller than that of other portions. By screwing the threaded shaft 67a into a threaded hole 69b formed in the water tube mount 69, the dimension setting member 67 is fixed to the water tube mount 69. Instead of this structure, the dimension setting member 67 may be fixed by screwing a nut (not shown) to the threaded shaft 67a and tightening the nut.

The header cover 68 is fastened by a bolt 66 screwed into a threaded hole 67b formed adjacent to the base end of the dimension setting member 67, and thereby fixed to the dimension setting member 67. A part of the inner surface of the header cover 68 is held in contact with the end surface 67c of the base end of the dimension setting member 67. With such a structure, the distance s1 between the water tube mount 69 and the header cover 68 corresponds to the dimension from the end surface 67c of the dimension setting member 67 to the end surface 67d of the stepped portion, so that the distance can be set accurately to a desired dimension. With the header structure of this embodiment, when the edge of a rounded region of the standing portion 69a of the water tube mount 69 which is rounded with a radius R (boundary between the rounded portion and a portion which is not rounded) positionally corresponds to the edge Ed of the header cover 68, stress concentration on this region is likely to occur. According to this embodiment, such improper fitting can be prevented by accurately setting the distance s1 to an appropriate dimension.

The side wall 70e of the casing 7 is laid on the outer side of the header cover 68 and fixed by the bolt 66 to the dimension setting member 67 together with the header cover 68. With this structure, the header 6A can be properly mounted to the casing 7 while reducing the total number of bolts, so that reduction in the number of parts and facilitation of the assembling can be realized. Further, the structure in which the header 6A is arranged in the casing 7 can be easily realized.

Figure 6:
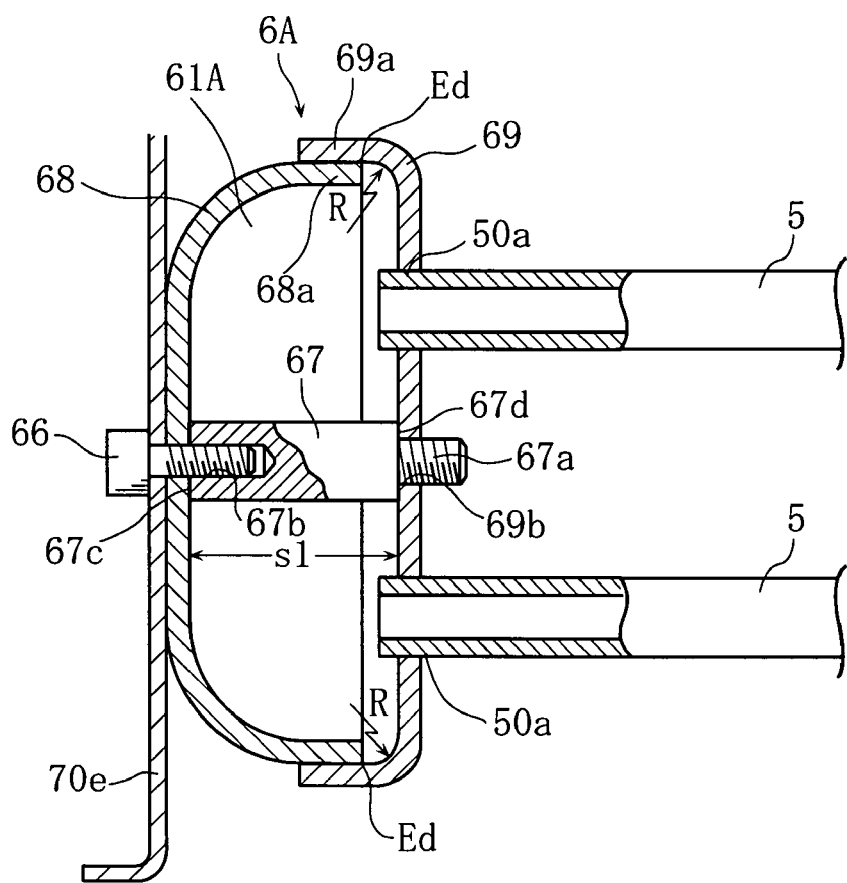
FIG. 6 is a plan sectional view of a principal portion of FIG. 4.

In FIG. 6, only the water inflow chamber 61A of the header 6A is illustrated, and the illustration of the hot-water outflow chamber 61B is omitted. The structure of the hot-water outflow chamber 61B is similar to that of the water inflow chamber 61A. The structure of the common chamber 61C is also basically similar, and the description thereof is omitted. Of the structural elements of the hot-water outflow chamber 61B and the common chamber 61C shown in FIG. 4, the elements which are similar to those of the water inflow chamber 61A are designated by the same reference signs as those used for the chamber 61A.

Figure 7:
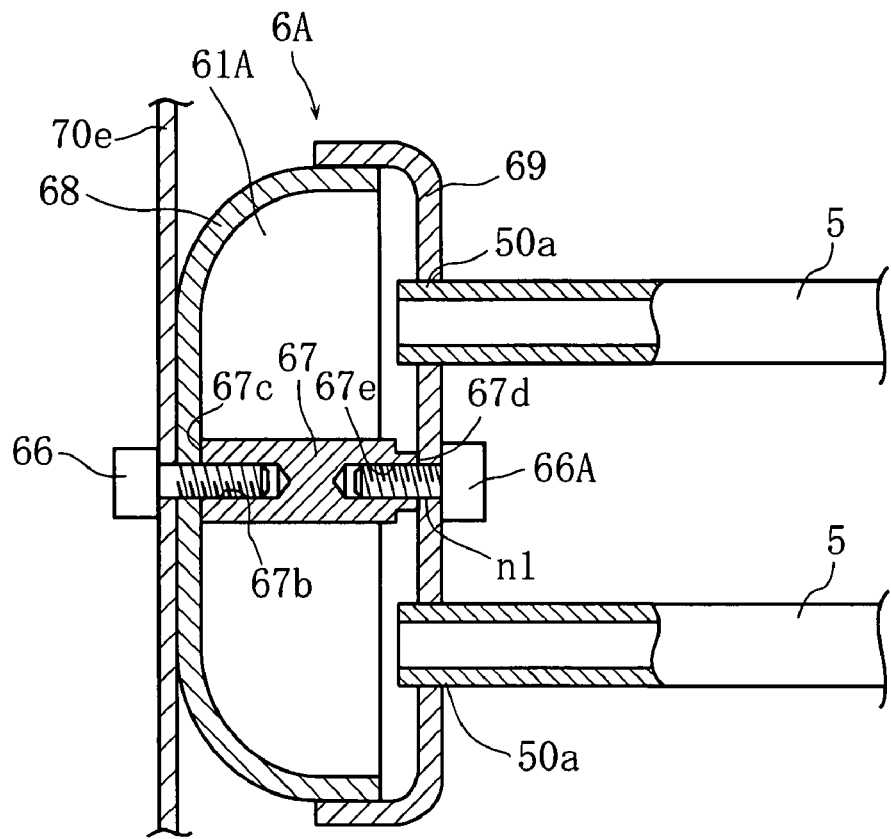
FIG. 7 is a plan sectional view of a principal portion of a variation of the structure shown in FIG. 6.

As shown in FIG. 7, the dimension setting member 67 may be in the form of a shaft formed with a threaded hole 67e. The dimension setting member 67 is mounted by screwing a bolt 66A into the threaded hole 67e. With this structure, even when a slight crack is formed in the water tube mount 69 at a portion (indicated by the reference sign n1) sandwiched between the head of the bolt 66A and the end surface 67d of the stepped portion of the dimension setting member 67, water leakage from this portion can be prevented or lessened, because this portion is covered by the head of the bolt 66A. Also in the structure shown in FIG. 6, water leakage can be prevented from easily occurring by increasing the thickness of the water tube mount 69, for example.

As shown in FIG. 3, the casing 7 is so arranged that the bottom wall 70b partially covers an upper portion of the primary heat exchanger 1. The combustion gas flowing upward through the primary heat exchanger 1 goes around to the rear side of the casing 7 and then enters the gas supply port 72 of the rear wall 70d. At the lower edge of the gas supply port 72, a flow controlling portion 74 for controlling the flow of combustion gas is provided. The flow controlling portion 74 is formed by bending the portion connected to the lower edge of the gas supply port 72 into an L-shaped cross section. The flow controlling portion includes a plate portion 74a projecting forward from the lower edge of the gas supply port 62 generally horizontally and a standing portion 74b standing from the edge of the plate portion 74a. As better shown in FIG. 8, the flow controlling portion 74 is not provided along the entire dimension of the gas supply port 72 in the longitudinal direction (lateral direction). The flow controlling portion 74 is not provided at opposite end portions n2 of the gas supply port 72. Unlike the gas discharge port 71, the gas supply port 72 extends generally in parallel with the water tubes 5.

As shown in FIG. 1, each of the water tubes 5 and the casing 7 of the secondary heat exchanger B are longer than the width of the housing 10 of the primary heat exchanger 1. Therefore, the casing 7 includes, at opposite ends thereof adjacent to the headers 6A and 6B, protruding portions Sa and Sb which protrude laterally from the housing 1. The protruding portion Sb is longer than the protruding portion Sa. With this structure, the header 6A is positioned close to a water inlet 11a of the primary heat exchanger 1.

The water heater A1 of this embodiment is a wall-mounted water heater which is used with the external casing 4 mounted to a wall of a house, for example. At the bottom of the external casing 4 are provided a plurality of tube connection portions 40 for connecting external tubes (not shown) for water inflow or hot-water outflow, for example. Water is supplied from the outside to the water inlet 60A of the header 6A trough the tube connection portions 40 and a tube (not shown) connected thereto. Hot water exiting from the hot-water outlet 60B of the header 6A is supplied to the water inlet 11a of the primary heat exchanger 1. The hot water exiting from the hot-water outlet 11b of the primary heat exchanger 1 is mixed with water by utilizing a mixing valve (not shown) for adjustment to an appropriate temperature and supplied to an external tube through the tube connection portions 40. In the present invention, however, the manner of water flow for the heat exchangers is not limited. For instance, water may be first supplied to the primary heat exchanger, and hot water passed through the primary heat exchanger may be supplied to the secondary heat exchanger B.

Below the protruding portion Sb of the casing 7 is defined a space, in which a controller 8 is arranged. The controller 8 includes a CPU, a memory coupled thereto, and a circuit board on which other electronic components are mounted. The controller controls the operation of each part of the water heater A1 and signal processing, such as the control of the supply of combustion gas to the burner 3 and the number of rotations of the fan 31, for example.

The operation and advantages of the water heater A1 will be described below.

When combustion gas is generated by driving the burner 3, the combustion gas moves upward and passes successively through the primary heat exchanger 1 and the secondary heat exchanger B. In this process, sensible heat of the combustion gas is recovered in the primary heat exchanger 1, whereas latent heat is recovered in the secondary heat exchanger B. By the recovery of sensible heat and latent heat, water supplied to and flowing through the water tubes 11 and 5 is heated, whereby hot-water of an appropriate temperature is obtained properly.

When latent heat is recovered by the secondary heat exchanger B, strongly acidic condensate water is produced on a surface of each of the water tubes 5. However, since the water tube 5 is inclined, the condensate water immediately flows along the water tube 5 toward the lower end, i.e., the first end 50a. Therefore, the condensate water is prevented from remaining on a wide region of the surface of the water tube 5. Therefore, the heat exchange between the combustion gas and each of the water tubes 5 is not inhibited by the condensate water. After reaching the first end 50a, the condensate water drops down from the first end 50a or the header 6A. The condensate water is then received by the bottom wall 70b of the casing 7, flows into the discharge port 73, and is then supplied to the neutralizer 2 to be neutralized.

Unlike the above, some of the condensate water drops down directly without reaching the first end 50a. The secondary heat exchanger B is so designed that the combustion gas flows from the gas supply port 72 at the rear wall 70d of the casing 7 toward the gas discharge port 71 at the front wall 70c, and the bottom wall 70b of the casing 7 covers the entirety of the lower portions of the water tubes 5. Therefore, the condensate water dropping from portions of the water tubes 5 other than the first end 50a can also be properly received by the bottom wall 70b. Since the bottom wall 70b is inclined similarly to the water tubes 5, the condensate water flows smoothly along the bottom wall 70b toward the discharge port 73 and sent to the neutralizer 2. On the other hand, since water of relatively low temperature flows into the water inflow chamber 61A of the header 6A, dropwise condensation may occur at the outer surface. However, since the header 6A is accommodated in the casing 7, the dropwise condensation is also received by the bottom wall 70b and sent to the neutralizer 2 through the discharge port 73, similarly to the above-described condensate water. Therefore, in the water heater A1, portions outside the casing 7 can be prevented from being contaminated by condensate water or dropwise condensation.

When combustion gas enters the casing 7 of the secondary heat exchanger B through the gas supply port 72, the combustion gas passes through spaces between adjacent water tubes 5 and the gap 79a and 79b, and is then discharged to the outside through the gas discharge port 71. As noted before, the water tubes 5 and the inner surfaces of the upper wall 70a and the bottom wall 70b of the casing 7 are generally in parallel with each other, and the width s2, s3 of the gaps 79a, 79b are generally constant in the longitudinal direction. Therefore, reduction of the heat exchange efficiency is properly prevented. Unlike this embodiment, when the gaps 79a and 79b do not have a generally constant width in the longitudinal direction, a large amount of combustion gas flows through a wider portion, whereby the amount of heat recovery from the combustion gas may be reduced. According to the present invention, such risk can be properly eliminated, and high heat exchange efficiency can be achieved.

Since each of the water tubes 5 is longer than the width of the housing 10 of the primary heat exchanger 1, the heat transfer area is large. Therefore, the amount of latent heat recovery by the secondary heat exchanger B can be increased, and the heat exchange efficiency can be enhanced. As another means to increase the heat transfer area of the water tubes 5, it may be considered to increase the number of water tubes 5. However, this means complicates the structure and increases the manufacturing cost. As compared to this, the means of just increasing the length of the water tubes 5 according to this embodiment is advantageous in that the structure does not become complicated and the manufacturing cost does not increase. As shown in FIG. 1, due to the long length of the water tubes 5, the casing 7 of the secondary heat exchanger B includes the protruding portion Sb which protrudes from the housing 10 of the primary heat exchanger 1. However, the controller 8 is efficiently arranged in the space below the protruding portion. Therefore, an increase in the size of the water heater A1 can be prevented. Further, since the dimension of the protruding portion Sa on the opposite side of the protruding portion Sb is smaller, the length of a connection pipe between the header 6A and the primary heat exchanger 1 can be advantageously reduced.

Figure 8:
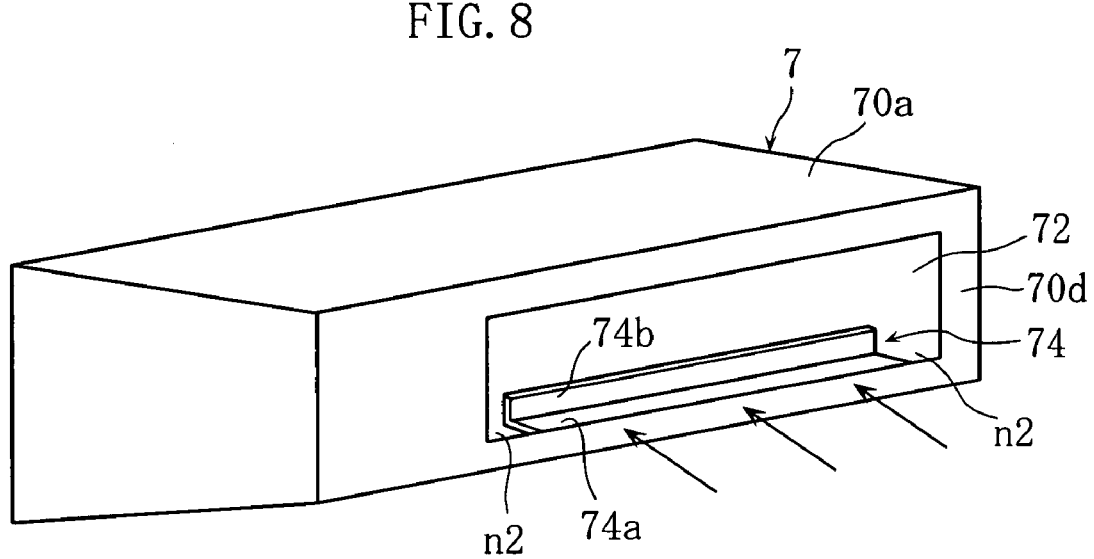
FIG. 8 is a perspective view showing a casing of the secondary heat exchanger of the water heater of FIG. 1, as viewed from the rear side.

As indicated by an arrow N1 in FIG. 3, when combustion gas enters the casing 7, part of the combustion gas hits against the flow controlling portion 74 provided at the lower edge of the gas supply port 72. Therefore, the combustion gas is prevented from directly traveling to the region AR1 which is a lower region directly in front of the gas supply port 72. As shown in FIG. 3, condensate water may drop from the water tubes 5a, which are positioned adjacent to the gas supply port 72, to the region AR1. When hot combustion gas immediately after passing through the primary heat exchanger 1 flows directly to the region AR1, the condensate water is heated at a high temperature and evaporates instantaneously, generating a big sound of evaporation. Such a sound of evaporation, if often generated, not only grates on the user but also makes the user wrongly determine that there is an abnormality in the water heater. According to this embodiment, however, the direct flow of the combustion gas to the region AR1 is prevented, so that such a problem is properly solved. The hot combustion gas hit against the flow controlling portion 74 is guided so as to travel directly to the water tubes 5. Therefore, the heat exchange between the combustion gas and the water tubes 5 is promoted, whereby the heat exchange efficiency is enhanced. Further, as shown in FIG. 8, flow controlling portion 74 is not provided at longitudinally opposite end portions n2 of the lower edge of the gas supply port 72. The end portions n2 serve to reduce the flow resistance of the combustion gas and promote the smooth flow of the combustion gas into the casing 7. As the combustion gas flow controlling means, use may be made of one which does not include the standing portion 74b and comprises only the plate portion 74a, unlike the flow controlling portion 74. Also with this structure, it is possible to prevent the combustion gas from flowing directly toward the bottom wall 70b of the casing 7 immediately after passing through the gas supply port 72 and prevent the generation of evaporation sound of condensate water.

When water supply to the primary heat exchanger 1 and the secondary heat exchanger B is stopped to drain water from these parts for preventing freezing, for example, water can be drained from the primary heat exchanger 1 relatively easily, because the water tubes 11 have a relatively large diameter. On the other hand, the water tubes 5 of the secondary heat exchanger B have a relatively small diameter. However, the secondary heat exchanger is so inclined that the header 6A is positioned lower than the header 6B. This inclination causes the water in each of the water tubes 5 to smoothly flow toward the header 6A and to be discharged from the header 6A to the outside. As described with reference to FIG. 5, the water flowed into the water inflow chamber 61A of the header 6A can be properly drained off through the water inlet 60A, whereas the water flowed into the hot-water outflow chamber 61B can be properly drained off through the auxiliary water discharge port 62. Therefore, the arrangement of one of the water inlet 60A and the hot-water outlet 60B at a higher position does not deteriorate the water draining efficiency.

In the water heater A1, although the water tubes 5 and the upper and the bottom walls 70a and 70b of the casing 7 are inclined, the gas discharge port 71 is not inclined and extends in the horizontal direction. Therefore, the water heater A1 has a wide range of application. For example, a connection portion provided in a pipe space of an apartment is generally so designed as to connect a horizontally-extending gas discharge port of a water heater. Therefore, the water heater A1 can be suitably used as installed at a portion provided with such a connection portion.

Figure 9:
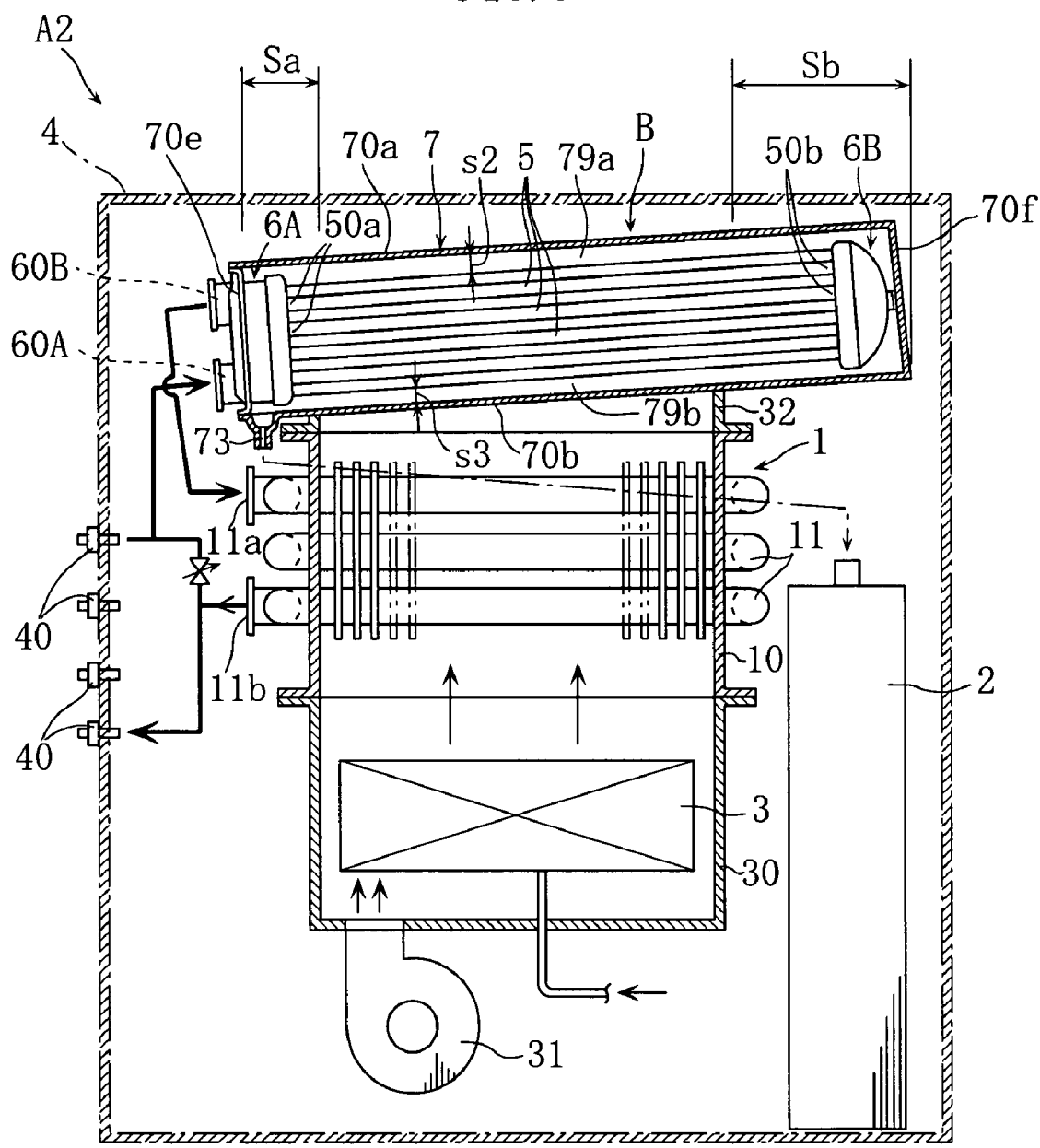
FIG. 9 is a schematic front sectional view showing another example of water heater according to the present invention.

FIG. 9 shows another embodiment of water heater according to the present invention. In this figure, the elements which are identical or similar to those of the foregoing embodiment are designated by the same reference signs as those used for the foregoing embodiment.

The water heater A2 shown in FIG. 9 is of a floor standing type designed to be used as installed on the ground or a floor, and includes an external casing 4 having a side wall provided with a plurality of tube connection portions 40. In the water heater A2, the neutralizer 2 is arranged in the space below the protruding portion Sb of the secondary heat exchanger B, whereby the space is efficiently utilized. On the other hand, the space below the protruding portion Sa is utilized as the piping space for the primary heat exchanger 1 and the secondary heat exchanger B, and pipes for the heat exchangers are collectively arranged in this portion.

As will be understood from this and foregoing embodiments, when the secondary heat exchanger B is designed to protrude from the housing 10 of the primary heat exchanger 1, the spaces below the protruding portions can be efficiently utilized by appropriately arranging other structural parts of the water heater. With this structure, an increase in the entire size of the water heater is prevented.

The present invention is not limited to the foregoing embodiments. The specific structure of each part of the water heater according to the present invention can be varied in design in various ways.

As the water tubes of the secondary heat exchanger, use may be made of water tubes other than straight water tubes, and u-shaped water tubes may be used, for example. When U-shaped water tubes are used, hot-water can be caused to flow along a U-turn in the U-shaped tubes itself. Therefore, the header 6B provided in the foregoing embodiments for enabling U-turning of hot water can be eliminated, whereby the structure of the secondary heat exchanger can be simplified. The inclination angle of the water tubes of the secondary heat exchanger is not limited to a specific one. It is only necessary that the inner surfaces of the upper wall and the bottom wall of the casing are inclined at an angle approximately equal to the inclination angle of the water tubes. Therefore, similarly to the water tubes, the inclination angle of the inner surfaces is not limited to a specific one.

As the burner, a burner other than a gas burner, such as an oil burner, may be used, and the kind of the burner is not limitative. Instead of the forward combustion type in which the combustion gas generated by the burner flows upward, the water heater according to the present invention may be structured as the reverse combustion type in which the combustion gas flows downward. In such a case, the secondary heat exchanger is arranged under the primary heat exchanger.

The water heater according to the present invention may be designed as a water heater other than that for supplying hot water to a kitchen or a bath. For example, the water heater may be designed as one to be used for heating a floor, melting snow and so on, and the destination and use of hot water is not limitative.

The invention claimed is:

1. A water heater comprising a burner, a primary heat exchanger for recovering sensitive heat from combustion gas generated by the burner, and a secondary heat exchanger for recovering latent heat from the combustion gas;

the secondary heat exchanger comprising:

a plurality of water tubes extending in a predetermined direction and each including a first end and a second end spaced from each other in the predetermined direction;

a casing including a plurality of walls surrounding the water tubes, one of the walls being formed with a gas supply port for introducing combustion gas passed through the primary heat exchanger into the secondary heat exchanger, whereas another one of the walls being formed with a gas discharge port for discharging the combustion gas to outside; and a header including a water inlet and a hot-water outlet and connected to the respective first ends of the water tubes for performing water inflow to the water tubes and hot-water outflow from the water tubes;

wherein the water tubes are so inclined that the first ends are positioned lower than the second ends for causing water to flow into the header when water inflow is stopped to drain water from the water tubes;

wherein the plurality of walls of the casing include an upper wall and a bottom wall positioned above and below the water tubes via an upper gap and a lower gap, respectively, and a rear wall and a front wall positioned behind and in front of the water tubes, respectively, the rear wall comprising the wall formed with the gas supply port whereas the front wall comprising the wall formed with the gas discharge port, so that the combustion gas flows through a space between the water tubes and through the upper and the lower gaps generally horizontally and width wise in a front and rear direction of the casing; and wherein the upper wall and the bottom wall are so inclined that inner surfaces thereof extend generally in parallel with the water tubes, and each of the upper and the lower gaps has a width which is generally constant along said predetermined direction.

2. The water heater according to claim 1, wherein, in a front view of the casing, the gas discharge port extends in a direction inclined with respect to the inner surfaces of the upper wall and the bottom wall; and wherein the casing is so oriented that the discharge port extends horizontally.

3. The water heater according to claim 1, wherein the water tubes are divided into two groups in the front and rear direction of the casing;

wherein the header includes a water inflow chamber and a hot-water outflow chamber each of which is connected to the first ends of the water tubes of a respective one of the groups, the water inlet and the hot-water outlet being formed at the water inflow chamber and the hot-water outflow chamber, respectively, the water inflow chamber and the hot-water outflow chamber being arranged side by side in the front and rear direction of the casing;

wherein one of the water inlet and the hot-water outlet is provided at a portion which is offset toward an upper end of the corresponding one of the water inflow chamber and the hot-water outflow chamber, whereas the other one of the water inflow chamber and the hot-water outflow chamber is provided at a portion which is offset toward a lower end of the corresponding one of the water inflow chamber and the hot-water outflow chamber; and wherein, of the water inflow chamber and the hot-water outflow chamber, the chamber in which the water inlet or the hot-water outlet is provided at a portion offset toward the upper end of the chamber is formed with an auxiliary water discharge port for discharging water from the chamber to outside, the auxiliary water discharge port being provided at a portion offset toward the lower end of the chamber.

4. The water heater according to claim 1, wherein the primary heat exchanger is arranged at either one of a position above the casing of the secondary heat exchanger and a position below the casing of the secondary heat exchanger and includes a housing for passing the combustion gas and a water tube at least partially arranged in the housing for performing heat exchange with the combustion gas; and wherein the casing and the plurality of water tubes of the secondary heat exchanger have a horizontal dimension which is larger than a width of the housing to protrude toward sides of the housing, the protruding dimension being larger on the second end side than the first end side.

5. The water heater according to claim 4, further comprising a controller for controlling driving of the burner, and a neutralizer for neutralizing condensate water formed accompanying latent heat recovery;
wherein the secondary heat exchanger is provided on the housing of the primary heat exchanger so that, on a side of the housing, a space is defined below the protruding portion on the second end side of the secondary heat exchanger; and
wherein at least one of the controller and the neutralizer is arranged in the space.

6. The water heater according to claim 1, wherein at least part of the header is positioned within the casing so that dropwise condensation formed on an outer surface of the header drops onto the bottom wall of the casing.

7. The water heater according to claim 6, wherein the header comprises a water tube mount to which the first end of each of the water tubes is connected, a dimension setting member including an end fixedly connected to the water tube mount, a header cover bonded to the water tube mount with part of which held in contact with another end of the dimension setting member and defining each of the chambers between the header cover and the water tube mount, and a bolt for fixing the header cover to said another end of the dimension setting member;
wherein the casing of the secondary heat exchanger includes a side wall laid on an outer surface of the header cover, the side wall being connected by the bolt to the dimension setting member together with the header cover.

8. The water heater according to claim 1, further comprising a combustion gas flow controlling means provided in the casing for preventing combustion gas passed through the gas supply port from directly flowing toward the bottom wall of the casing.

9. The water heater according to claim 8, wherein the combustion gas flow controlling means includes a plate-like portion projecting generally horizontally from a lower edge of the gas supply port toward the front wall.

* * * * *